(No Model.)
J. HAWTHORN & J. P. LIDDELL.
CONSTRUCTION OF DRYING CYLINDERS.
No. 332,901. Patented Dec. 22, 1885.
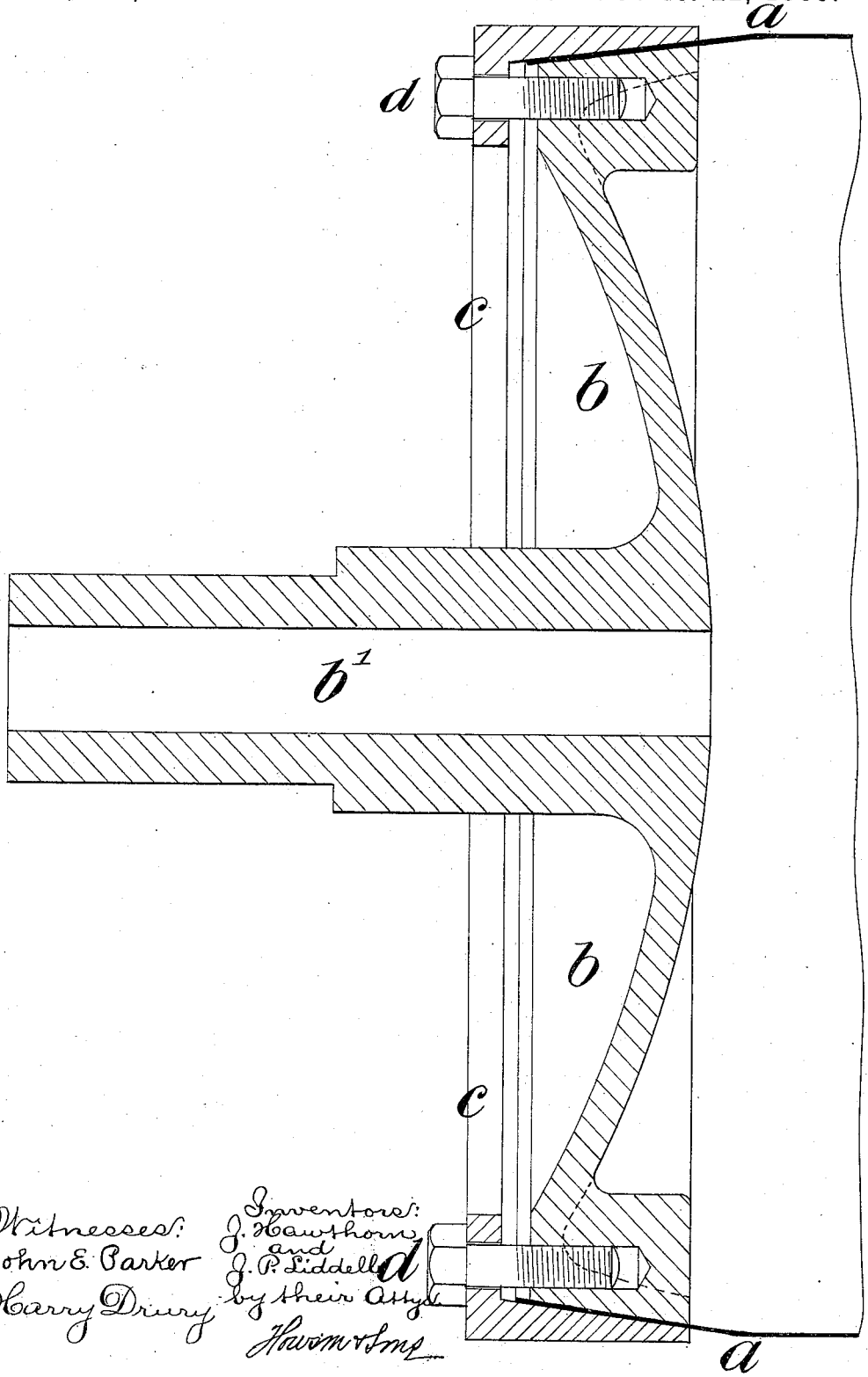
Witnesses:
John E. Parker
Harry Drury
Inventors:
J. Hawthorn
and
J. P. Liddell
by their Atty.
Hawm & Sms

UNITED STATES PATENT OFFICE.

JOHN HAWTHORN AND JOHN P. LIDDELL, OF NEWTOWN, COUNTY OF CHESTER, ENGLAND.

CONSTRUCTION OF DRYING-CYLINDERS.

SPECIFICATION forming part of Letters Patent No. 332,901, dated December 22, 1885.

Application filed December 18, 1884. Serial No. 150,690. (No model.) Patented in England November 12, 1884, No. 14,881.

*To all whom it may concern:*

Be it known that we, JOHN HAWTHORN and JOHN PEMBERTON LIDDELL, subjects of the Queen of Great Britain and Ireland, and residing at Newtown, county of Chester, England, machinists, have invented certain Improvements in and in the Construction of Drying or Steam-Heated Cylinders, (for which we have obtained a patent in Great Britain, No. 14,881, November 12, 1884,) of which the following is a specification.

Our invention relates to the steam-heated cylinders used in the drying of woven fabrics, in the drying of paper in the process of manufacture, and for other purposes. The cylindrical portions of such cylinders are usually made of sheet-copper or of tinned sheet-iron, and previously to our invention the ends have been secured to the said cylindrical portions by riveting and soldering or by soldering. When so made, there is a liability for leakage of steam to take place, owing to the failure of the solder in any part of the joint, and the removal and replacement of the ends when repairs have been required have necessitated a considerable expenditure of time and trouble.

To remedy these defects is the object of our invention. We make the cylinder slightly conical at each end, and we turn or form the end disks or blocks on their peripheries to portions of cones, so as to fit the interiors of the coned ends of the cylinders. Outside the cylinder end we apply a metal ring, which is turned or formed to a hollow conoidal form to fit the coned end of the cylinder. The said ring and the disk or block are drawn together by means of screws or bolts, so as to tightly grip the end of the cylinder between the two parts.

In the accompanying drawing, one end of a cylinder is represented in section, the line of section being taken on the axis of the cylinder and of one of its journals.

In the drawing, $a$ is a portion of the cylinder proper. $b$ is one of the cylinder ends or end disks or blocks, on which is cast or formed the hollow journal $b'$, and $c$ is the exterior metal ring. The cylinder end is coned from the end to the point $a$, or thereabout, and the periphery of the end $b$ is turned to the form of a portion of a cone having the same taper as the end of the cylinder, so that when the end $b$ is placed in position it fits the coned end of the cylinder. The ring $c$ may be made of brass, steel, wrought-iron, or any suitable metal or alloy, and is turned internally to have the same conical taper as the periphery of the end $b$. At intervals around the end $b$ holes are drilled and tapped to receive the screws $d\ d$. In order to provide sufficient metal at the points where these holes are drilled, bosses or paps are formed, so that the holes do not extend through the metal. The screws pass through holes in the ring $c$. The ring may be of an annular form in section, or may be formed with swells at intervals to receive the screws or bolts.

When the parts are put together, as in the drawing, and the screws are tightened, the end $b$ is drawn outward toward the ring $c$, and the ring is forced farther onto the cylinder, so that the metal of the latter becomes tightly clamped between the two conical surfaces of the end $b$ and the ring $c$.

As many screws are used as may be considered to be necessary to insure a tight joint. Bolts might be substituted for the screws; but in such a case we should prefer that the bolt-holes did not extend through the metal of the end $b$.

When the parts are formed and put together in the indicated manner, a steam-tight joint can be obtained without the use of solder, and we prefer not to use any solder; but, if for any reason it be desired to make the joint more secure by the use of solder or cement, such might be used.

The use of solder not being necessary, the parts can be readily and quickly put together in a steam-tight manner, and be easily taken apart when repairs are necessary.

What we claim as our invention is—

1. The combination of the sheet-metal body of a drying-cylinder with the end $b$, having a conical periphery, and the internally-coned ring adapted to be applied to the outside of the coned end, and screws to force the ring over the end of the cylinder, substantially as described.

2. The combination of the sheet-metal body of a drying-cylinder with the end having a hollow journal and a coned periphery, and an internally-coned ring adapted to be forced onto the periphery of the said end over the sheet metal of the body of the cylinder, substantially as described.

In testimony whereof we have signed our names to this specification in the presence of two subscribing witnesses.

JOHN HAWTHORN.
JOHN P. LIDDELL.

Witnesses:
DAVID FULTON,
EDWARD K. DUTTON.